United States Patent
Kowal et al.

(10) Patent No.: US 8,685,302 B2
(45) Date of Patent: Apr. 1, 2014

(54) MONOLITHIC ACOUSTICALLY-TREATED COMPOSITE STRUCTURES AND METHODS FOR FABRICATING THE SAME

(75) Inventors: Adam Kowal, Phoenix, AZ (US); Jeff M. Hein, Tempe, AZ (US); David E. Wilcox, Gilbert, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/400,432

(22) Filed: Feb. 20, 2012

(65) Prior Publication Data

US 2013/0213729 A1 Aug. 22, 2013

(51) Int. Cl.
*B29C 70/30* (2006.01)
*B64D 33/04* (2006.01)

(52) U.S. Cl.
USPC .......................... 264/258; 181/214

(58) Field of Classification Search
USPC ......................................... 264/258
See application file for complete search history.

(56) References Cited

U.S. PATENT DOCUMENTS

| | | | |
|---|---|---|---|
| 2,039,886 A | 5/1936 | Cohn | |
| 2,498,753 A | 2/1950 | Deitsch | |
| 2,942,682 A | 6/1960 | Bergh et al. | |
| 3,019,850 A * | 2/1962 | March | 181/224 |
| 3,481,427 A * | 12/1969 | Dobbs et al. | 181/292 |
| 3,743,493 A | 7/1973 | Lemelson | |
| 4,065,339 A * | 12/1977 | Lippert et al. | 156/149 |
| 4,080,185 A | 3/1978 | Richter et al. | |
| 4,284,457 A * | 8/1981 | Stonier et al. | 156/237 |
| 4,557,297 A * | 12/1985 | Montana | 138/141 |
| 4,600,619 A * | 7/1986 | Chee et al. | 428/118 |
| 4,671,841 A * | 6/1987 | Stephens | 156/292 |
| 4,743,740 A * | 5/1988 | Adee | 219/548 |
| 5,175,401 A * | 12/1992 | Arcas et al. | 181/292 |
| 5,223,067 A * | 6/1993 | Hamamoto et al. | 156/173 |
| 5,251,435 A | 10/1993 | Pauley | |
| 5,491,308 A | 2/1996 | Napier et al. | |
| 5,571,242 A | 11/1996 | Demorest | |
| 5,676,216 A | 10/1997 | Palma et al. | |
| 5,709,762 A | 1/1998 | Rowan | |
| 5,741,456 A * | 4/1998 | Ayrton | 264/400 |

(Continued)

FOREIGN PATENT DOCUMENTS

| | | |
|---|---|---|
| EP | 1767325 A3 | 5/2007 |
| FR | 2710874 A1 | 4/1995 |

OTHER PUBLICATIONS

CN Office Action for Application No. 201320077087.3 dated Jun. 9, 2013.
EP Search Report for EP 13153933.0 dated Dec. 16, 2013.

(Continued)

*Primary Examiner* — Matthew Daniels
(74) *Attorney, Agent, or Firm* — Ingrassia Fisher & Lorenz, P.C.

(57) ABSTRACT

Monolithic acoustically-treated composite structures and methods for fabricating the same are provided. A monolithic acoustically-treated composite structure comprises an internal frame assembly comprising a unitary composite frame structure and at least one acoustic panel assembly. The unitary composite frame structure defines a shape of the monolithic acoustically-treated composite structure to be fabricated. A composite overlay covers the internal frame assembly. The method for fabricating the monolithic acoustically-treated composite structure comprises forming the unitary composite frame structure, including the at least one acoustic panel in the unitary composite frame structure, and covering the internal frame assembly with the composite overlay.

12 Claims, 12 Drawing Sheets

(56) References Cited

U.S. PATENT DOCUMENTS

| | | | |
|---|---|---|---|
| 5,743,488 A * | 4/1998 | Rolston et al. | 244/53 B |
| 5,771,680 A | 6/1998 | Zahedi et al. | |
| 5,944,060 A | 8/1999 | MacKay | |
| 5,975,237 A | 11/1999 | Welch et al. | |
| 6,178,764 B1 | 1/2001 | Tanaka et al. | |
| 6,280,320 B1 | 8/2001 | Paschke et al. | |
| 6,579,170 B1 | 6/2003 | Davis | |
| 6,827,180 B2 * | 12/2004 | Wilson | 181/292 |
| 7,195,290 B2 | 3/2007 | Duffy | |
| 7,578,534 B2 | 8/2009 | Wuerfel, III | |
| 7,604,095 B2 | 10/2009 | Mitchell | |
| 7,867,566 B2 | 1/2011 | Blanton et al. | |
| 7,963,098 B2 | 6/2011 | Rivera | |
| 8,459,407 B2 * | 6/2013 | Jangili | 181/224 |
| 2005/0284098 A1 | 12/2005 | Sumrall | |
| 2006/0145004 A1 | 7/2006 | Drost et al. | |
| 2006/0145006 A1 | 7/2006 | Drost | |
| 2008/0289288 A1 | 11/2008 | Bertrand | |
| 2008/0302915 A1 * | 12/2008 | Yip et al. | 244/132 |
| 2009/0053043 A1 | 2/2009 | Moon | |
| 2011/0203725 A1 | 8/2011 | Rivera | |

OTHER PUBLICATIONS

EP Examination Report for EP 13 153 933.0 dated Jan. 14, 2014.

\* cited by examiner

MONOLITHIC ACOUSTICALLY-TREATED COMPOSITE STRUCTURES AND METHODS FOR FABRICATING THE SAME

TECHNICAL FIELD

The present invention generally relates to sound attenuating structures made from composite materials and fabrication thereof, and more particularly relates to monolithic acoustically-treated composite structures and methods for fabricating the same.

BACKGROUND

Composite materials (or simply "composites") are lightweight and high strength and thus are widely used to fabricate composite structures, such as aircraft components including airflow ducts, and other types of structures. As known in the art, composites are manufactured from a reinforcement material embedded in a matrix material. Acoustic attenuation features can be added to the composite structures, resulting in "acoustically-treated composite structures."

Conventional methods for fabricating acoustically-treated composite structures require two separate female molds for forming composite ply lay-ups. The lay-ups are vacuum bagged, cured separately, and then joined together by fasteners and bonding agents forming seams where joined. An acoustic core and perforated acoustic facesheet are included in one or both of the composite ply lay-ups to provide acoustic treatment for sound attenuation. A third tool is typically used to align the two cured products before fastening and bonding them together at the seams. The conventional acoustically-treated composite structure is layed up from the outside in. Thus, as the interior surface of the conventionally fabricated acoustically-treated composite structure is opposite a tool side, the resultant interior surface is typically rough and not closely toleranced. Therefore, post-curing processing of the interior surface may be needed when the interior surface thereof is a critical feature such as, for example, in an acoustically-treated composite airflow duct.

An airflow duct provides a compressor of an aircraft auxiliary power unit (APU) with a uniform supply of air in order to prevent the compressor from stalling. The interior surface of the airflow duct serves as the flowpath for air passage therethrough. Even small interior surface discontinuities can cause airflow distortion problems that can result in engine problems as well as significant efficiency losses. Therefore, if a conventionally fabricated acoustically-treated composite airflow duct is to retain its function of providing sufficient air with a minimum of turbulence, the above-described post-curing processing is often required to smooth the interior surface thereof to create as little distortion as possible.

Therefore, conventional methods for fabricating acoustically-treated composite structures require significant time-consuming assembly and post-curing processing with extensive tooling. Maintaining the positioning of acoustic cores and perforated acoustic facesheets during vacuum bagging is difficult. Conventional fabrication methods also result in an expensive and heavy acoustically-treated composite structure as the seams and fasteners undesirably add weight. The presence of seams in the fabricated acoustically-treated composite structure also compromises its structural integrity, and aerodynamic and fireproof properties. Monolithic composite structures have been fabricated, but inclusion of sound-attenuating acoustic cores and facesheets therein has not been successful because of the complex shape and relatively small cross-sectional sizes used in some structures, for example aircraft airflow ducts. As used herein, the term "monolithic" refers to a seamless unitary closed cross-sectional structure. The term "closed" as used herein refers to a structure that has a continuous cross-section.

Accordingly, it is desirable to provide monolithic acoustically-treated composite structures and methods for fabricating the same. In addition, it is desirable to provide monolithic acoustically-treated composite structures that have improved structural integrity, improved aerodynamic and fireproof properties, and are more lightweight than conventional acoustically-treated composite structures. It is also desirable to provide methods for fabricating the same that are simpler, eliminating seams, requiring fewer tools, reducing assembly and post-curing processes, permitting more control over the critical tolerances of the interior surface, and providing easier inclusion of sound attenuating acoustic cores and perforated acoustic facesheets.

BRIEF SUMMARY

Monolithic acoustically-treated composite structures are provided. In accordance with one exemplary embodiment, a monolithic acoustically-treated composite structure comprises an internal frame assembly and a composite overlay covering the internal frame assembly. The internal frame assembly comprises a unitary composite frame structure and at least one acoustic panel assembly included in the unitary composite frame structure. The unitary composite frame structure defines a shape of the monolithic acoustically-treated structure.

Methods are provided for fabricating a monolithic acoustically-treated composite structure in accordance with yet another exemplary embodiment of the present invention. The method comprises forming a unitary composite frame structure. At least one acoustic panel assembly is included in the unitary composite frame structure. The unitary composite frame structure cooperates with the at least one acoustic panel assembly to form an internal frame assembly. The internal frame assembly is covered with a composite overlay.

Methods are provided for fabricating a monolithic acoustically-treated composite structure in accordance with yet another exemplary embodiment of the present invention. The method comprises providing a male lay-up tool shaped to define an interior periphery of the monolithic acoustically-treated composite structure to be fabricated. One or more composite plies are selectively laid up along an outer surface of the male lay-up tool forming a first composite lay-up. The first composite lay-up is cured forming a unitary composite frame structure. At least one acoustic panel assembly is included in the unitary composite frame structure. The at least one acoustic panel assembly cooperates with the unitary composite frame structure to form an internal frame assembly. One or more composite plies are laid up over the internal frame assembly forming a second composite ply lay-up. The second composite ply lay-up is cured. The male lay-up tool is removed.

Furthermore, other desirable features and characteristics of the present invention will become apparent from the subsequent detailed description of the invention and the appended claims, taken in conjunction with the accompanying drawings and this background of the invention.

BRIEF DESCRIPTION OF THE DRAWINGS

The present invention will hereinafter be described in conjunction with the following drawing figures, wherein like numerals denote like elements.

DETAILED DESCRIPTION

Figure 1:
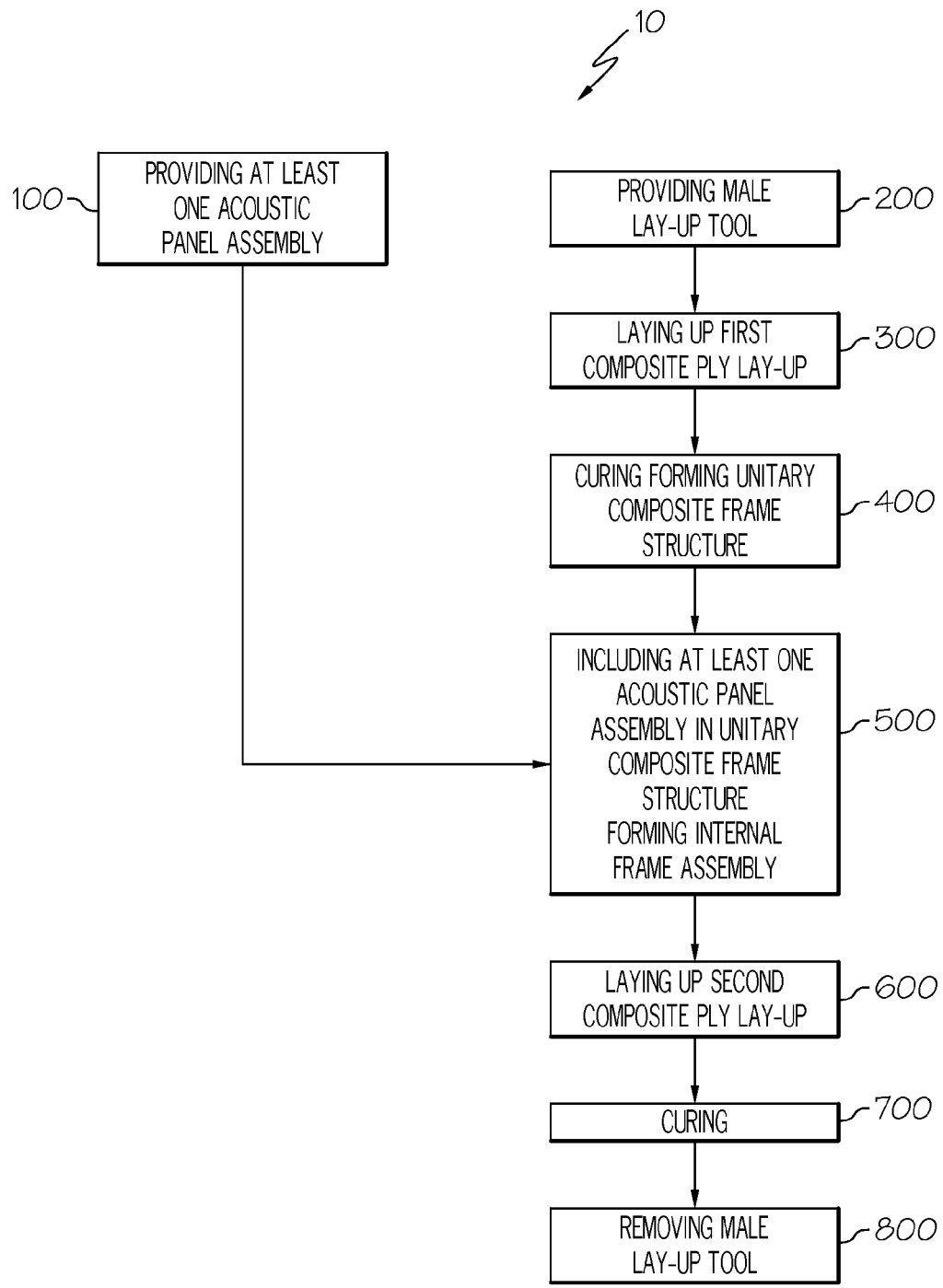
FIG. 1 is a flow diagram of methods for fabricating monolithic acoustically-treated composite structures, according to exemplary embodiments.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Various exemplary embodiments are directed to monolithic acoustically-treated composite structures and methods for fabricating the same. Such fabrication methods are simpler, eliminate seams in the structure, and permit more control over critical tolerances of the interior surfaces, reducing assembly and post-curing processing thereof, thereby saving time and expense. The monolithic acoustically-treated composite structures produced by such methods have improved structural integrity, improved aerodynamic and fireproof properties, and are more lightweight than conventionally fabricated acoustically-treated composite structures. As noted above, the term "monolithic" as used herein refers to a seamless unitary structure. As used herein, the term "acoustically-treated" means that the "acoustically-treated" monolithic composite structure includes at least one acoustic panel assembly that confers sound attenuation properties to the structure. According to exemplary embodiments of the present invention, the monolithic acoustically-treated composite structure comprises an internal frame assembly comprising a unitary composite frame structure defining an internal shape or flowpath of the monolithic acoustically-treated structure and at least one acoustic panel assembly included in the unitary composite frame structure. The at least one acoustic panel assembly and the unitary composite frame structure cooperate to form the internal frame assembly of the monolithic acoustically-treated composite structure. A composite overlay covers the internal frame assembly forming the monolithic acoustically-treated composite structure.

While fabrication of a monolithic acoustically-treated composite airflow duct 12 (FIG. 2) will be described for purposes of illustration, it is to be understood that method 10 (FIG. 1) for fabricating a monolithic acoustically-treated composite structure according to exemplary embodiments may be used to fabricate structures other than airflow ducts. Other exemplary monolithic acoustically-treated composite structures fabricated by the methods disclosed herein may include, for example, aircraft structural and non-structural components, cabin interiors, engine compartments and other enclosures in which the interior surface thereof is a critical feature because of its intended function(s), and in which sound attenuation properties are desired.

Figure 2:
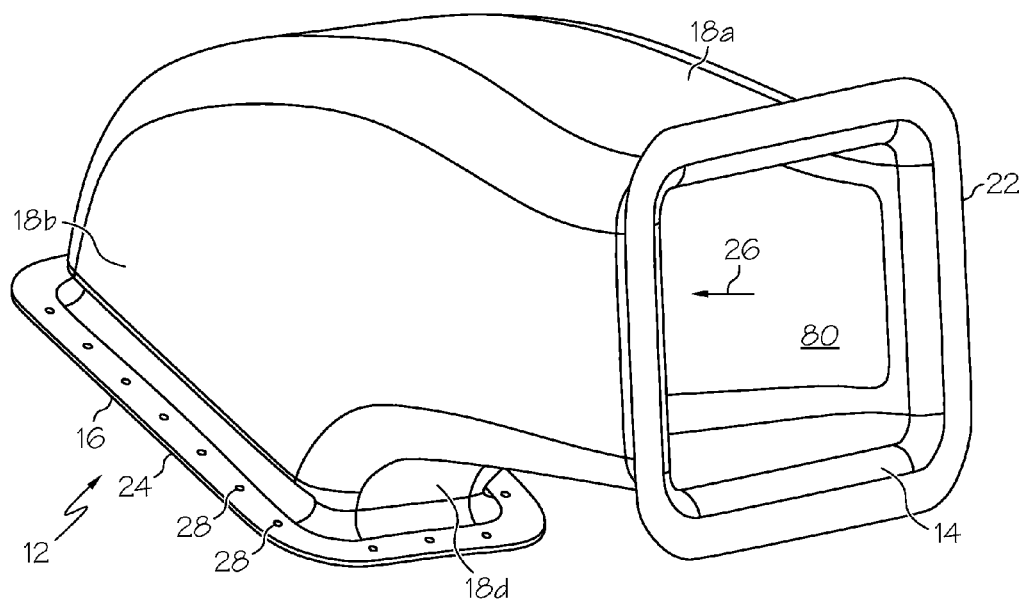
FIG. 2 is a perspective view of an exemplary monolithic acoustically-treated composite airflow duct fabricated by the methods of FIG. 1, in accordance with exemplary embodiments.

FIG. 2 illustrates the exemplary monolithic acoustically-treated composite airflow duct 12 to be fabricated by the methods of FIG. 1, according to exemplary embodiments. The exemplary monolithic acoustically-treated composite airflow duct 12 has an entrance airflow opening 14, an exit airflow opening 16, and a top sidewall 18a, a left sidewall 18b, a right sidewall (hereinafter identified as 18c but not shown), and a bottom sidewall 18d. The plurality of sidewalls 18a through 18d extends from the entrance airflow opening to the exit airflow opening. An acoustic panel assembly 20 is included in sidewalls 18a, 18b, and 18c (see FIG. 11). Sidewall 18d includes an integral side panel 71 (See FIG. 5), as hereinafter described. The entrance and exit airflow openings 14 and 16 are surrounded by integral outwardly-extending upper and lower flanges 22 and 24 configured to connect the airflow duct 12 to a surrounding structure (not shown). The sidewalls 18a through 18d define a hollow interior flowpath (indicated by arrow 26) for air passage. The integral outwardly-extending lower flange 24 surrounding the exit airflow opening 16 includes a plurality of openings 28 configured to receive fasteners (not shown) for connecting the airflow duct 12 to the surrounding structure. It is to be understood that means other than fasteners for connecting the airflow duct to the surrounding structure(s) may be used.

Figure 3:
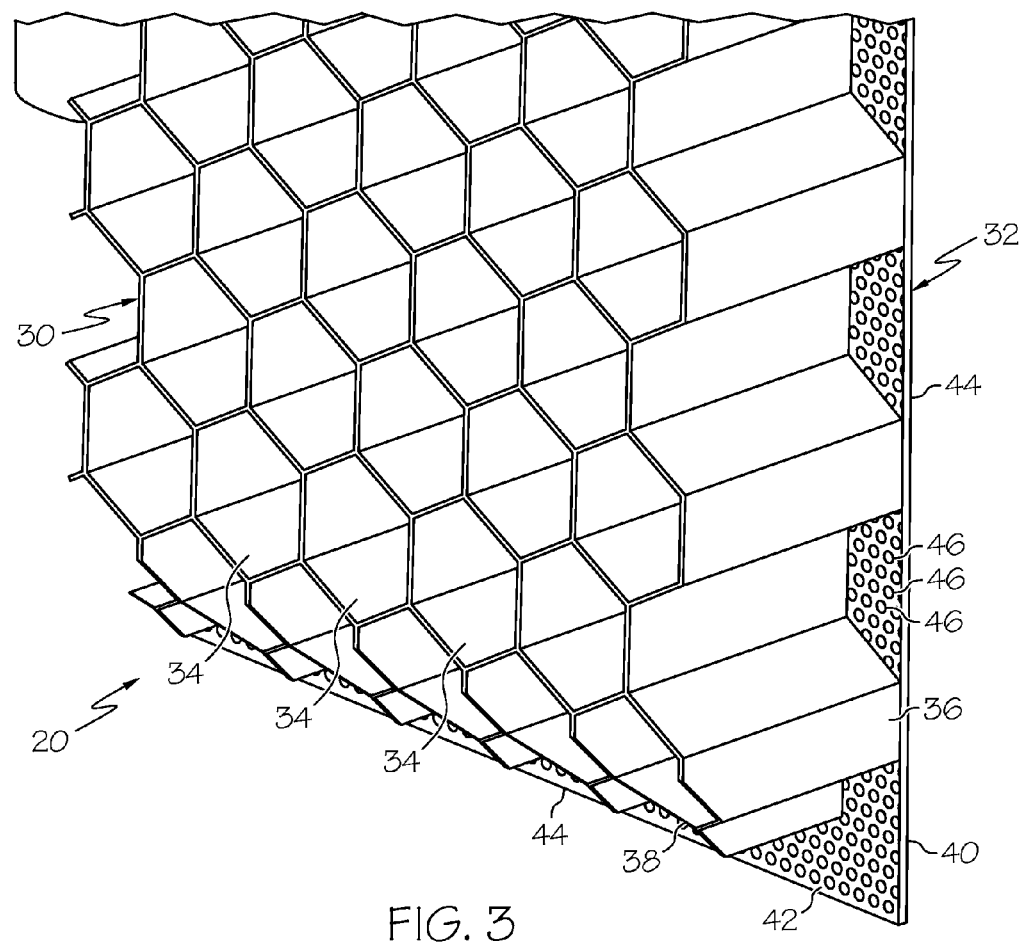
FIG. 3 is a perspective view of a portion of an acoustic panel assembly comprising an acoustic core and a perforated acoustic facesheet.
Figure 4:
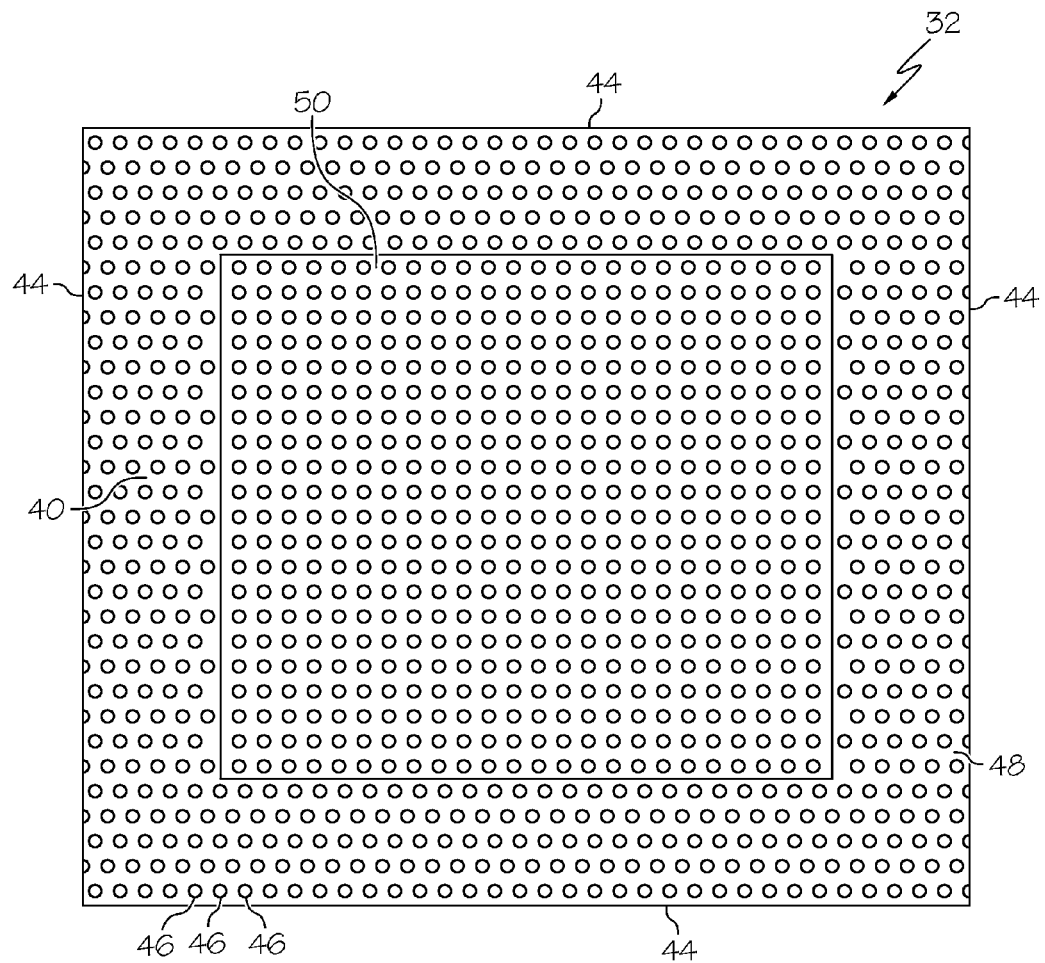
FIG. 4 is a top view of a front surface of the acoustic panel assembly of FIG. 3.

Referring again to FIG. 1 and now to FIGS. 3 and 4, in accordance with exemplary embodiments, the method 10 for fabricating a monolithic acoustically-treated composite structure, such as the airflow duct 12 of FIG. 2, begins by providing the at least one acoustic panel assembly 20 (step 100). The at least one acoustic panel assembly 20 comprises an acoustic core 30 and a perforated acoustic facesheet 32.

The acoustic core 30 comprises a plurality of cells 34, wherein each cell of the plurality of cells is defined by cell walls. The acoustic core 30 has a first end 36 and a second end 38. The shape of the cells is not limited to the illustrated shape and instead can have any shape. For example, the cells of the acoustic core 30 illustrated in FIG. 3 have a generally hexagonal cross-section. It is to be understood that other polygon shapes may be used and the polygon shape may or many not be equilateral, regular, or equiangular. The cells may be notched for fluid drainage. The relative sizing, configuration and material selection of the above-discussed variables are well known to those skilled in the art. For example, the acoustic core 30 can be formed from any suitable material including, for example, metals such as titanium, aluminum and alloys thereof, ceramics, plastics, and composites. In an embodiment, the acoustic core 30 may be made from polymeric cellular material, such as plastic honeycomb core material for aircraft structural applications conforming, for example, to SAE International Standard AMS-C-8073.

The perforated acoustic facesheet 32 comprises a metal mesh or plate material and has a front surface 40, a rear surface 42, and end surfaces 44 disposed between the front and rear surfaces 40 and 42. The perforated acoustic facesheet 32 includes a plurality of spaced perforations 46. The size, number, and spacing of perforations will depend on the acoustic requirements. As shown best in FIG. 4, the front surface 40 includes a peripheral border portion 48 surrounding an interior portion 50, for purposes as hereinafter described. The interior portion 50 of the perforated acoustic facesheet 32 forms a portion of the interior surface of the monolithic acoustically-treated composite structure, as hereinafter described. Suitable perforated acoustic facesheets are available from Purolator Facet, Inc. (Greensboro, N.C., USA), as well as others known to one skilled in the art. The perforated acoustic facesheet material is selected to a specific acoustic requirement according to the desired specifications as known to one skilled in the art.

Figure 9A:
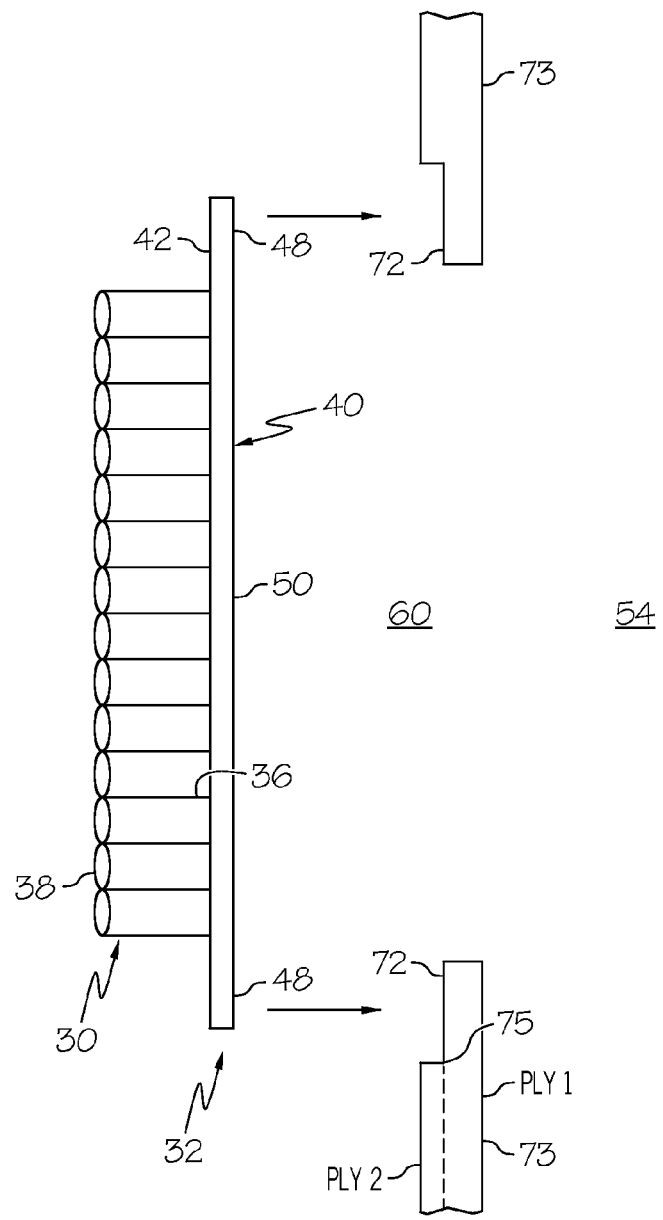
FIG. 9A through 9C and 10 are pictorial representations of the step of including at least one acoustic panel assembly (FIG. 3) in the unitary composite frame structure of FIG. 5 (only a portion of the unitary composite frame structure is illustrated and the acoustic panel assembly is not shown in FIGS. 9B and 9C)

Returning to FIG. 3, the rear surface 42 of the perforated acoustic facesheet 32 is affixed or secured to the first end 36 of the acoustic core 30 by a bonding agent, thereby forming the acoustic panel assembly 20 as illustrated in FIG. 9A. The bonding agent may be an epoxy film adhesive, or other bonding agent depending upon the environment in which the monolithic acoustically-treated composite structure is intended to be used. For example, if used in a typical aircraft operating environment, the bonding agent should be capable of maintaining superior high temperature properties. The bonding agent may be applied using the known process of reticulation. In general, the reticulation process involves applying the bonding agent around the edges of the cells at the first end 36 of the acoustic core 30 and then heat is applied to the second end 38 of the acoustic core. The bonding agent heats up and starts to bubble. The bonding agent then pops and lands only on the edges of the cells at the first end 36 of the acoustic core, without covering or filling the open cells.

Figure 5:
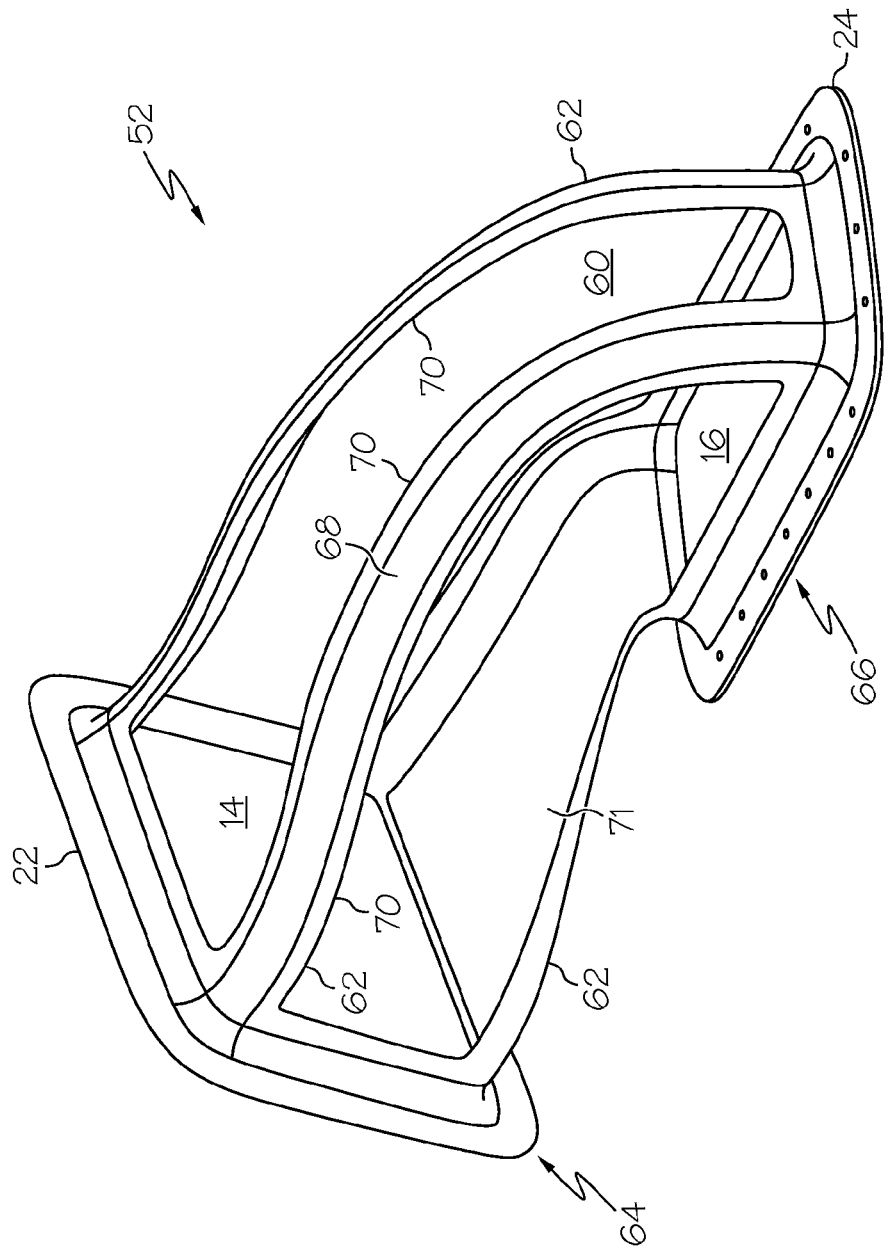
FIG. 5 is a perspective view of a unitary composite frame structure defining a shape of the monolithic acoustically-treated airflow duct of FIG.2.
Figure 6:
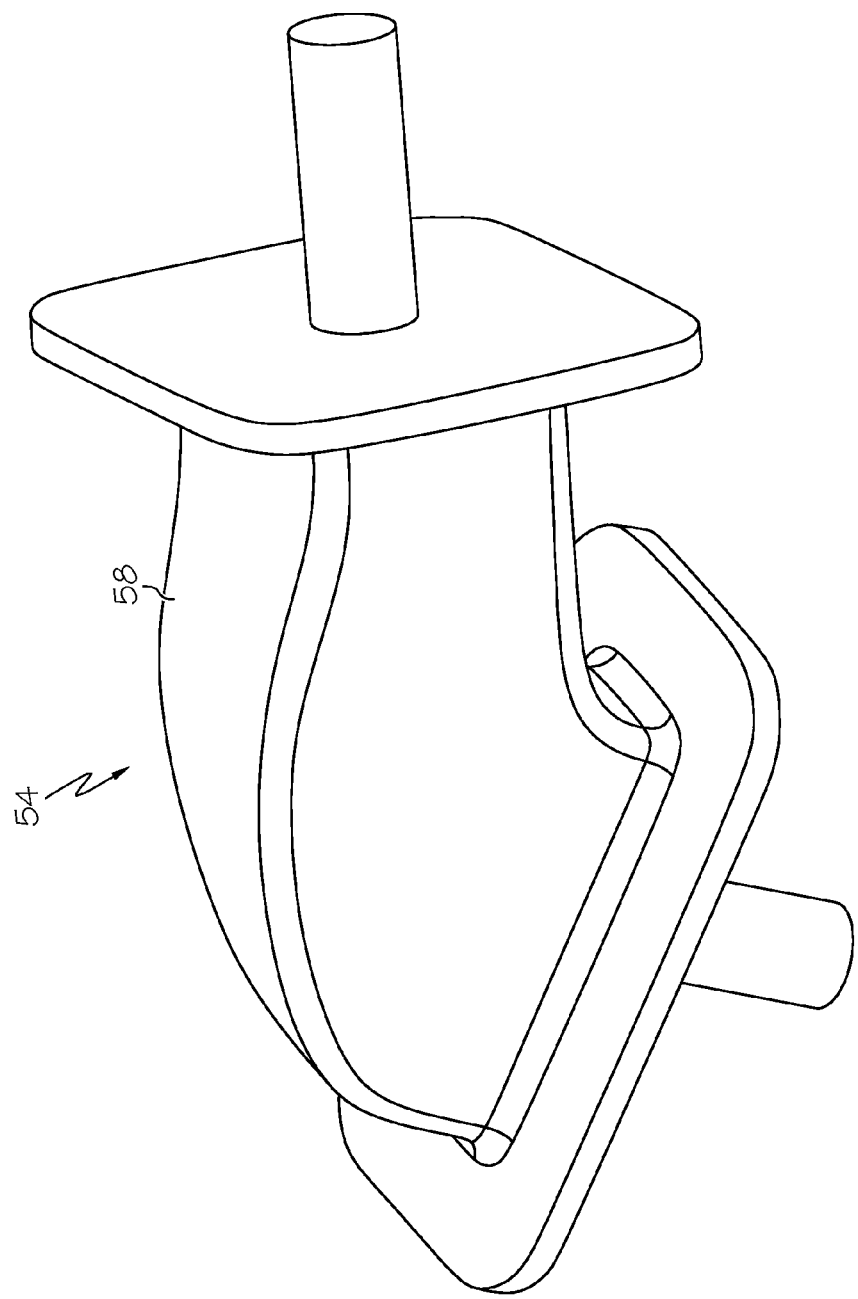
FIG. 6 is a perspective view of an exemplary male lay-up tool for fabricating the exemplary monolithic acoustically-treated composite airflow duct of FIG. 2, used in the methods of FIG. 1.

As noted above, the acoustic panel assembly 20 is to be included in a unitary composite frame structure 52 (e.g., FIG. 5). The fabrication of the unitary composite frame structure 52 will now be described. Referring again to FIG. 1 and now to FIG. 6, method 10 continues by providing a male lay-up tool 54, shaped to define an interior periphery of the monolithic acoustically-treated composite structure to be fabricated (step 200). Such male lay-up tools are well known in the art and may be commercially available. The male lay-up tool 54 may be of any material known to one skilled in the art including metal, wood, a soluble material, etc. FIG. 6 illustrates the male lay-up tool for fabricating the unitary composite frame structure 52 (FIG. 5) for the exemplary monolithic acoustically-treated airflow duct 12 of FIG. 2. The shape of the male lay-up tool is not limited to the illustrated shape (FIG. 6) and may vary depending upon the monolithic acoustically-treated composite structure to be fabricated.

Figure 7:
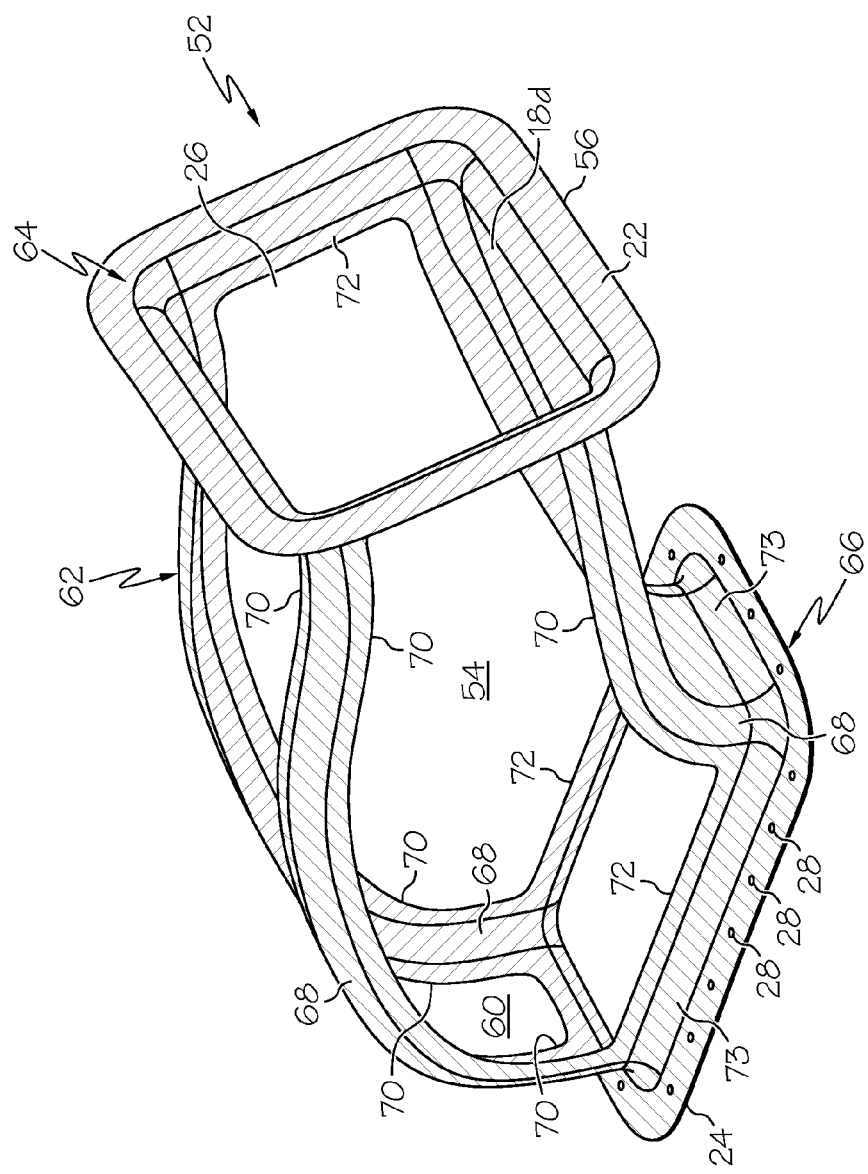
FIG. 7 is a pictorial representation of the steps of laying up one or more plies of a composite material on an outer surface of the male-lay-up tool of FIG. 6 forming a first composite ply lay-up and curing to form the unitary composite frame structure of FIG. 5, in accordance with exemplary embodiments.

Still referring to FIG. 1 and now to FIG. 7, method 10 continues by selectively laying up one or more composite plies along an outer surface 58 of the male lay-up tool 54 forming a first composite ply lay-up 56 conforming to the contours of the male lay-up tool (step 300). The first composite ply lay-up 56 is cured forming the unitary composite frame structure 52 (e.g., FIG. 5) on the male lay-up tool 54 (step 400). As noted above, and as known in the art, composites are manufactured from a reinforcement material embedded in a matrix material. As used herein, the term "reinforcement material" refers to the fabric or fiber material found in a composite. Suitable matrix materials include, for example, epoxy resins, phenolic resins, bismaleimide (BMI) resins, cyanate ester resins, polyester resins, vinyl resins, or a combination thereof. Their suitability depends upon the environment in which they are to be used. For example, as known in the art, polyester resins should not be applied on aircraft except for very limited non-structural use. Suitable reinforcement material for composites includes, for example, fiberglass, carbon fiber (graphite), and aramid fabrics or fibers. Suitable exemplary composites for the airflow duct 12 include, for example, a graphite-BMI resin composite, a graphite-phenolic resin composite, and a graphite-epoxy resin composite. The uncured matrix material can be introduced to the reinforcement material before (i.e., pre-impregnated forming a "prepreg") or after the reinforcement material is placed on the outer surface of the male lay-up tool to form the composite plies of the first and second composite lay-ups, as hereinafter described. The matrix material changes state from a liquid or flexible state to a solid state during curing. The matrix material can be partially cured in a prepreg. The term "composite ply lay-up" refers to the number of composite plies and their orientation needed to produce a composite structure. A "ply" refers to a layer of the composite ply lay-up.

To cure the first composite ply lay-up 56, the entire structure (the one or more composite plies laid up on the male lay up tool) is vacuum bagged (not shown but well known in the art) and placed in an autoclave (also not shown). As used herein, the term "curing" or the like refers to hardening of the one or more composite plies of the first and second composite ply lay-ups (as hereinafter described) at an elevated temperature and pressure for a predetermined amount of time. "Cure" is the time duration and temperature needed for the matrix material in the composite to harden. The curing temperatures, pressures, and time duration depend upon the reinforcement material/matrix material combination being cured as known to one skilled in the art. The first composite lay-up 56 is cured to hold the shape of the unitary composite frame structure 52 (FIG. 5). The unitary composite frame structure defines a shape of the monolithic acoustically-treated structure to be fabricated.

The unitary composite frame structure 52, such as for fabricating the exemplary airflow duct 12 (FIG. 2), comprises an at least partially open and multi-sided skeletal framework comprising a plurality of interconnected frame members. The plurality of interconnected frame members may cooperate to define at least one side opening 60 in the unitary composite frame structure 52, for purposes as hereinafter described. The unitary composite frame structure 52 may further comprise at least one integral side panel 71 (to form sidewall 18d of FIG. 2) that at least partially encloses the unitary composite frame structure and is formed by laying up one or more composite plies continuously on the outer surface of the male lay-up tool 54 on a side portion thereof as shown in FIG. 7. The at least one integral side panel is thus formed with the remainder of the unitary composite frame structure and is included in the at least one sidewall of the monolithic acoustically-treated composite structure to be fabricated, as hereinafter described.

Figure 8:
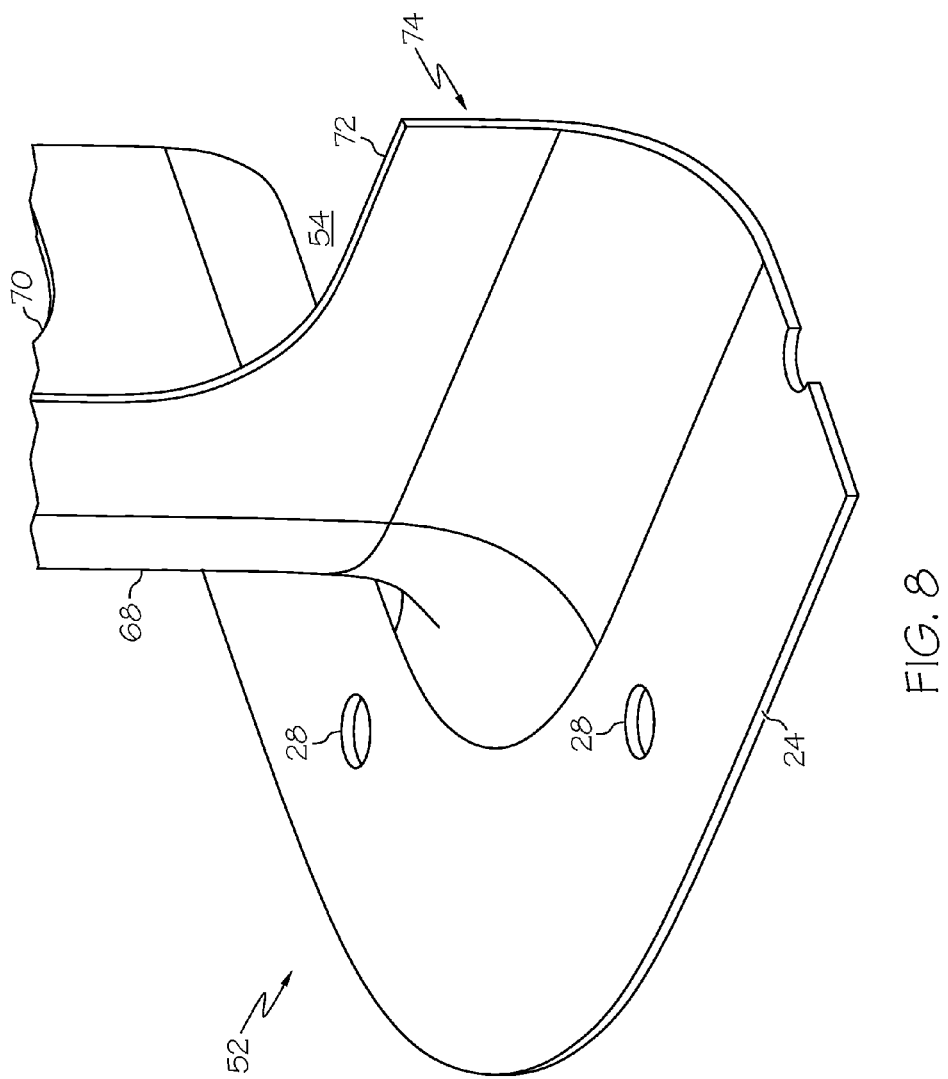
FIG. 8 is an enlarged perspective view of a corner portion of the unitary composite frame structure of FIGS. 5 and 7.

Still referring to FIGS. 5 and 7 and now to FIG. 8, the plurality of interconnected frame members of the unitary composite frame structure 52 comprises a plurality of spaced-apart side frame members 62 and upper and lower frame members 64 and 66 that interconnect the side frame members 62. Each side frame member 62 has a generally L-shaped cross-sectional configuration including a central panel 68 and a pair of narrow side flanges 70 oriented in angular relation to the central panel. Each narrow side flange 70 extends along a side edge of a respective side opening 60 and a side edge of a respective adjacent side opening 60. Alternatively, one or both of the narrow side flanges of each side frame member may be integral with the integral side panel 71 as illustrated in FIGS. 5 and 7. The unitary composite frame structure 52 for the exemplary airflow duct illustrated in FIGS. 7-13 has side frame members that are contoured and the central panel thereof has radiused corners. It is to be understood however that the side frame members need not be contoured and the central panel thereof may not be radiused. For example, the side frame members may be contoured, planar, or both, depending upon the monolithic acoustically-treated composite structure to be fabricated.

The upper and lower frame members 64 and 66 of the unitary composite frame structure each comprise a continuous ring that extends around opposing ends of the unitary composite frame structure 52. The upper and lower frame members 64 and 66 may also be formed in segments. A lower edge portion of the upper frame member 64 and an upper edge portion of the lower frame member 66 define a narrow flange portion 72 that extends respectively along a top edge and a bottom edge of each side opening 60, such that each side opening 60 (shown best in FIGS. 7 and 8) is surrounded by the narrow flange portion 72 on the top and bottom edges thereof and the respective narrow side flange 70 of a pair of the side frame members 62 (only one side frame member illustrated in FIG. 8). The narrow flange portion 72 on the top and bottom edges of each side opening and the respective narrow side flange 70 of the pair of the side frame members surrounding each side opening 60 cooperate to form a unitary, continuous perimeter mounting surface 74 (a portion thereof is illustrated in FIG. 8) extending around each side opening 60 to contact and provide a bonding surface for a peripheral border portion 48 of the acoustic panel assembly 20 (FIG. 4), as hereinafter described. An upper edge of the upper frame member 64 and a lower edge of the lower frame member 66 define the opposing ends of the unitary composite frame structure. An intermediate portion 73 may be disposed between the narrow flange portion and the respective upper and lower edges of the upper and lower frame members.

The exemplary unitary composite frame structure of FIG. 5 for the exemplary airflow duct 12 (FIG. 2) to be fabricated has three side openings, one integral side panel, and the upper edge of the upper frame member 64 and the lower edge of the lower frame member 66 are flared outwardly to respectively define the upper and lower flanges 22 and 24 surrounding the entrance and exit airflow openings 14 and 16 of the exemplary airflow duct 12. It is to be understood however that the shape of the unitary composite frame structure is not limited to the illustrated shape (FIG. 5) and may vary depending upon the monolithic acoustically-treated composite structure to be fabricated. In addition, it is to be understood that the unitary composite frame structure according to exemplary embodiments may have a fewer or greater number of side openings, and a fewer (i.e., no integral side panels) or greater number of integral side panels.

Figure 11:
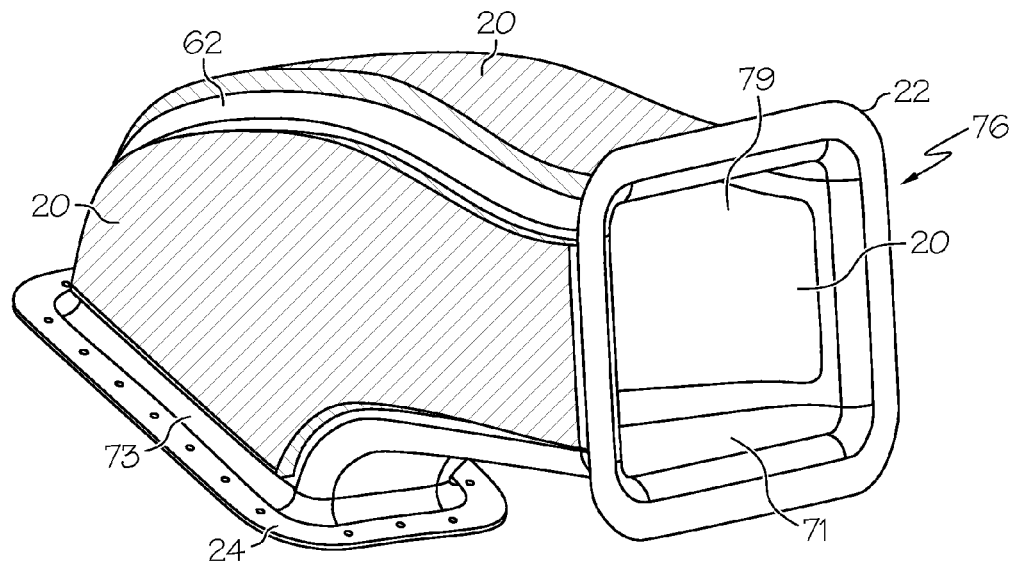
FIG. 11 is a perspective view of an internal frame assembly of the monolithic acoustically-treated composite airflow duct of FIG. 2.

Referring again to FIG. 1 and now to FIGS. 9A through 11, method 10 continues by including the at least one acoustic panel assembly 20 in the unitary composite frame structure 52 (step 500), thereby forming an acoustic panel assembly 76 (FIG. 11). As best illustrated in FIGS. 9A through 9C and 10, each acoustic panel assembly 20 is included in the unitary composite frame structure 52 by selectively positioning the acoustic panel assembly 20 to extend across one of the side openings 60 defined in the unitary composite frame structure 52. When included in the unitary composite frame structure, the peripheral border portion 48 of the front surface 40 of the perforated acoustic facesheet 32 is secured or mounted against an outside surface of the perimeter mounting surface surrounding the side opening 60. The perimeter mounting surface may be recessed from an outer surface of the unitary composite frame structure 52 forming an open relief pocket for positioning of the peripheral border portion of the acoustic panel assembly therein, as illustrated in FIGS. 9A and 9B, as hereinafter described. The peripheral border portion 48 of the front surface 40 of the perforated acoustic facesheet 32 is fitted outwardly against the perimeter mounting surface such that the interior portion 50 (FIGS. 4 and 9) of the front surface 40 of the perforated acoustic facesheet 32 is arranged on the outer surface 58 of the male lay-up tool 54 and conforms thereto. The acoustic core 30 of the acoustic panel assembly 20 extends outwardly and rearwardly from the rear surface 42 of the perforated acoustic facesheet 32. A bonding agent is applied to at least a portion of the peripheral border portion 48, the perimeter mounting surface 74 (such as the narrow flange portion 72 of the perimeter mounting surface 74 illustrated in FIGS. 9A through 9C), or both to secure the acoustic panel assembly 20 in the unitary composite frame structure 52. Each acoustic panel assembly 20 included in the unitary composite frame structure is positioned and secured to the respective continuous perimeter mounting surface 74 surrounding each side opening 60 in the same manner. The peripheral border portion 48 of the front surface 40 of each acoustic panel assembly 20 is secured outwardly and bonded to the perimeter mounting surface. The unitary composite frame structure cooperates with the at least one acoustic panel assembly included therein to form the internal frame assembly 76 (FIG. 11) for the monolithic acoustically-treated composite structure to be fabricated. Each acoustic panel assembly included in the unitary composite frame structure comprises a side panel of the internal frame assembly 76 and is included in a sidewall (such as sidewalls 18a, 18b, and 18c) of the monolithic acoustically-treated composite structure to be fabricated. As noted above, the integral side panel 71 may also be included in a sidewall (such as sidewall 18d) of the monolithic acoustically-treated composite structure to be fabricated.

Figure 9B:
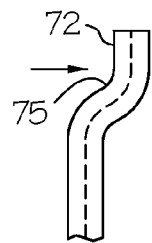
Figure 9C:
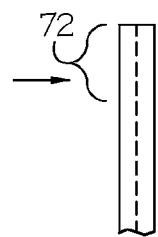
Figure 10:
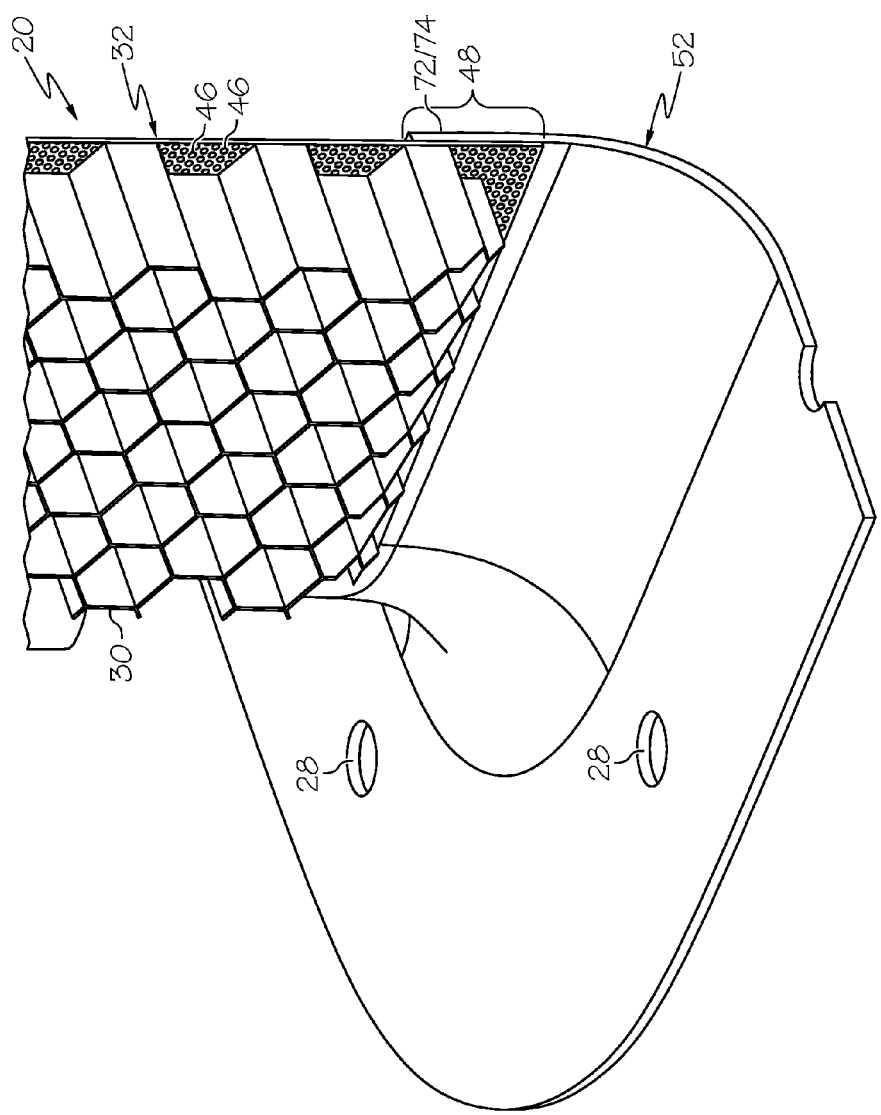

As illustrated in FIGS. 9A through 9B, the perimeter mounting surface 74 (as noted above, narrow flange portion 72 as illustrated in FIGS. 9A through 9C is a portion of the perimeter mounting surface 74) surrounding each side opening may present an open relief pocket 75 for positioning the acoustic panel assembly in the unitary composite frame structure. The open relief pocket may be machined into the unitary composite frame structure or formed from having one or more composite plies of the first composite lay-up trimmed back from the more interior plies thereof (FIG. 9A) (Ply 1 and Ply 2 are used for ease of illustration only in FIGS. 9A through 9C. It is to be understood that there may be more than two composite plies ("one or more composite plies")). In another embodiment, as illustrated in FIG. 9B, Ply 1 and Ply 2 (again for ease of illustration only) of the first composite lay-up may be joggled to form the open relief pocket 75 for positioning the perforated acoustic facesheet for bonding. As used herein, the term "joggled" and variations thereof refers to plies that have been pre-molded to fit precisely together. In other embodiments, as illustrated in FIG. 9C, the one or more composite plies (exemplified by Ply 1 and Ply 2) are substantially planar, without the open relief pocket. The peripheral border portion 48 of the perforated acoustic facesheet 32 is positioned against the perimeter mounting surface 74 and bonded into position as previously described.

As illustrated in FIG. 11, the internal frame assembly 76 for the exemplary airflow duct 12 illustrated in FIG. 2 comprises the unitary composite frame structure 52 including one integral side panel 71 and the three acoustic panel assemblies 20. The integral side panel 71 and the three acoustic panel assemblies (each a "side panel") are each connected along their side edges by the side frame members. Each side frame member extends substantially along the length of each of side edge of a respective side panel and a side edge of a respective adjacent side panel. It is to be understood that the internal frame assembly may have a fewer or greater number of acoustic panel assemblies (a minimum of one acoustic panel assembly), i.e., while three acoustic panel assemblies are included in the unitary composite frame structure of the internal frame assembly 76 for the exemplary illustrated airflow duct of FIG. 2, it is to be understood that a fewer or greater number of acoustic panel assemblies may be included in the unitary composite frame structure for an airflow duct or in unitary composite frame structures for other monolithic acoustically-treated composite structures.

The internal frame assembly defines an interior surface 80. The interior surface has a contoured or planar configuration that is substantially free of surface discontinuities. The one or more cured composite plies of the first composite ply lay-up 76 and the interior portion 50 of the front surface 40 of the perforated acoustic facesheet 32 of the at least one acoustic panel assembly cooperate to complete the interior surface of the internal frame assembly. The interior surface of the internal frame assembly comprises the interior surface of the monolithic acoustically-treated composite structure to be fabricated. As the first composite ply lay-up 76 and the interior portion 50 of the front surface 40 of the perforated acoustic facesheet 32 of the at least one acoustic panel assembly conform to the outer surface 58 of the male lay-up tool 54, and thus are defined by the smooth outer surface 58 thereof, the interior surface of the monolithic acoustically-treated composite structure (such as the exemplary airflow duct 12 (FIG. 2)) to be fabricated will thus also be smooth and closely toleranced, substantially free of surface discontinuities, thereby substantially eliminating the need for post-curing processing thereof (such as smoothing processes, for example).

Figure 12:
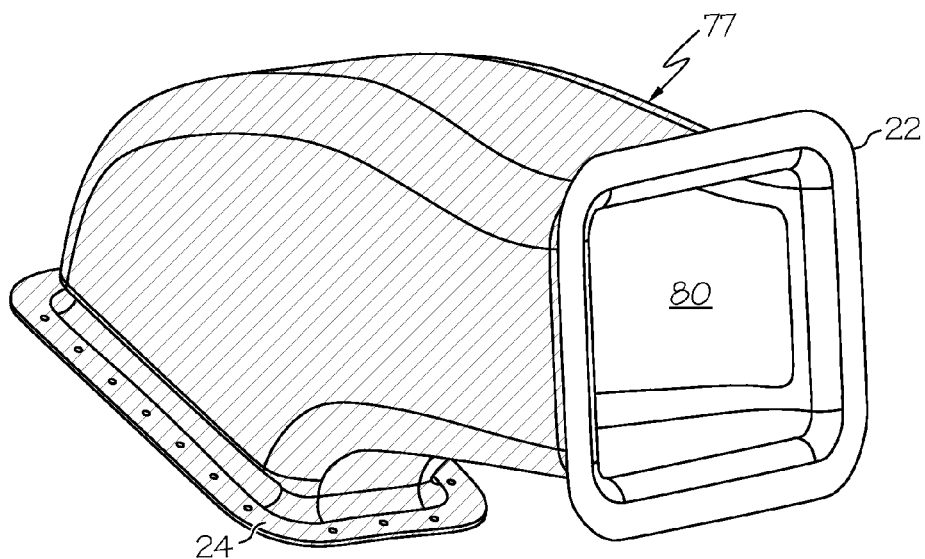
FIG. 12 is a pictorial representation of the step of laying up one or more plies of a composite to form a second composite lay-up over the internal frame assembly of FIG. 11.

Referring again to FIG. 1 and now to FIG. 12, method 10 continues by laying up one or more composite plies on the internal frame assembly 76 (step 600), thereby forming a second composite ply lay-up 77. The second composite ply lay-up 77 is laid up on the internal frame assembly 76 (that is still on the male lay-up tool 54). As noted above, the internal frame assembly 76 (FIG. 11) comprises the unitary composite frame structure 52 and the at least one acoustic panel assembly 20 included therein.

Figure 13:
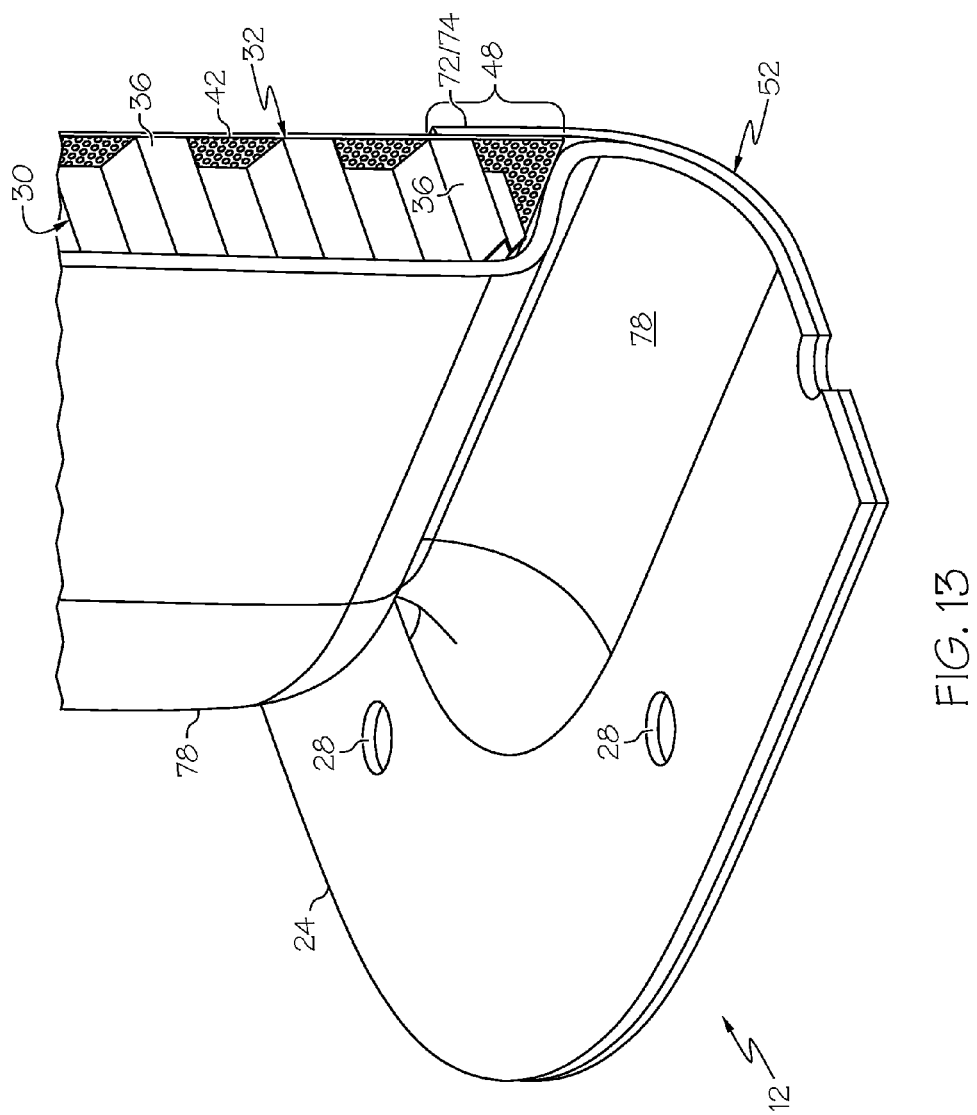
FIG. 13 is an enlarged perspective view of the corner portion of the fabricated exemplary monolithic acoustically-treated composite airflow duct of FIG. 2 after curing the second composite ply lay-up of FIG. 12 forming a composite overlay and removal of the male lay-up tool, illustrating a portion of the composite overlay on the internal frame assembly of FIG. 11.

Still referring to FIG. 1 and now to FIG. 13, method 10 continues by curing the second composite ply lay-up 77 (step 700), thereby forming a conforming overlay 78 covering the internal frame assembly 76 on the male lay-up tool. The conforming overlay comprises an outer covering that is of sufficient strength to support imposed loads. To cure the second composite ply lay-up 77, the entire structure (the second composite ply lay-up on the internal frame assembly that is still on the male lay up tool) is vacuum bagged (not shown but well known in the art) and placed in an autoclave (also not shown) under known curing conditions, i.e., the second composite ply lay-up and the internal frame assembly are cured on the male lay-up tool 54 as a unit.

Still referring to FIG. 1, according to exemplary embodiments, method 10 continues by removing the male lay-up tool 54 after step 700 (step 800), thereby resulting in the monolithic acoustically-treated composite structure, such as the airflow duct 12 of FIG. 2. The male lay-up tool 54 may be removed from the interior of the monolithic acoustically-treated composite structure in a conventional manner, such as by disassembly or if the tool is soluble, it may be dissolved by methods known to one skilled in the art. The monolithic acoustically-treated composite structure may be subjected to further processing if necessary, for example, trimming, smoothing, etc. as known in the art.

While inclusion of the at least one acoustic panel assembly 20 across at least one side opening in the unitary composite frame structure has been described, it is to be understood that the at least one acoustic panel assembly 20 may be used to render any desired portion or area of the monolithic composite structure acoustically treated. Therefore, the result in any embodiment is a monolithic acoustically-treated composite structure rendered acoustically treated at one or more "acoustically treated areas" by including the at least one acoustic panel assembly 20 in a selective position in the unitary composite frame structure 52. For example, the at least one acoustic panel assembly may be included in the unitary composite frame structure by selectively positioning the at least one acoustic panel assembly across an end opening in the same manner as previously described with respect to extending across a side opening. When the acoustic panel assembly is included in the unitary composite frame structure to enclose one or more open ends of the internal frame assembly, there may be no side openings in the unitary composite frame structure.

The monolithic acoustically-treated composite structures fabricated in accordance with methods according to exemplary embodiments are thus fabricated from the inside out rather than the conventional outside in fabrication. The monolithic acoustically-treated composite structures are of unitary seamless construction. The methods for fabricating the monolithic acoustically-treated composite structures are simpler, requiring fewer tools (a male lay-up tool, rather than separate female tools), reducing or eliminating assembly and post-curing processes, and eliminating seams in the composite structure. Such methods permit more control over the critical tolerances of the interior surface, and permit easy inclusion of the at least one acoustic panel assembly, thereby conferring sound attenuation properties to the monolithic acoustically-treated composite structure. The monolithic acoustically-treated composite structures fabricated in accordance with exemplary embodiments have the hollow interior cavity (such as the hollow interior flowpath passage 26 in the case of the exemplary airflow duct 12) with the interior surface that is precision contoured or planar and substantially free of surface discontinuities for unimpeded flow of air or other gases, the internal frame assembly that provides structural support and the composite overlay forming the outer covering of sufficient strength to support imposed loads. The monolithic acoustically-treated composite structure fabricated in accordance with exemplary embodiments also has improved structural integrity, improved aerodynamic and fireproof properties, and is more lightweight than a conventionally fabricated acoustically-treated composite structure.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for fabricating a monolithic acoustically-treated composite structure, the method comprising:
   forming a unitary composite frame structure;
   including at least one acoustic panel assembly comprising an acoustic core and a perforated acoustic facesheet in the unitary composite frame structure such that an interior portion of the perforated acoustic facesheet forms an interior surface portion of the monolithic acoustically-treated composite structure to be fabricated, the unitary composite frame structure cooperating with the at least one acoustic panel assembly to form an internal frame assembly; and
   covering the internal frame assembly with a composite overlay.

2. The method of claim 1, wherein the step of forming a unitary composite frame structure comprises:
   providing a male lay-up tool shaped to define an interior periphery of the monolithic acoustically-treated composite structure to be fabricated; and
   selectively laying up and curing one or more composite plies along an outer surface of the male lay-up tool to form a first composite ply lay-up.

3. The method of claim 2, wherein the step of covering the internal frame assembly with a composite overlay comprises:
   laying up one or more composite plies over the internal frame assembly on the male lay-up tool forming a second composite ply lay-up on the internal frame assembly;
   curing the second composite ply lay-up; and
   removing the male lay-up tool.

4. The method of claim 1, wherein the step of forming a unitary composite frame structure comprises forming the unitary composite frame structure comprising a plurality of interconnected frame members defining at least one side opening in the unitary composite frame structure.

5. The method of claim 4, further comprising the step of providing the at least one acoustic panel assembly prior to the including step, wherein an acoustic panel assembly of the at least one acoustic panel assembly comprises:
   the acoustic core comprising a plurality of cells having a first end and a second end; and
   the perforated acoustic facesheet having a front surface including a peripheral border portion surrounding the interior portion, a rear surface bonded to the first end of the acoustic core, and a plurality of spaced perforations.

6. The method of claim 5, wherein the step of including at least one acoustic panel assembly in the unitary composite frame structure comprises:
   applying a bonding agent to at least a portion of the peripheral border portion of the front surface of the perforated acoustic facesheet, to at least a portion of a perimeter mounting surface extending around each side opening in the unitary composite frame structure, or both; and
   positioning each acoustic panel assembly outwardly of the unitary composite frame structure to extend across a side opening of the at least one side opening thereof and securing the peripheral border portion against the perimeter mounting surface with the acoustic core extending rearwardly and outwardly from the perforated acoustic facesheet, the interior portion of the perforated acoustic facesheet positioned on the outer surface of the male lay-up tool forming the interior surface portion of the monolithic acoustically-treated composite structure.

7. The method of claim 6, wherein positioning each acoustic panel assembly comprises positioning each acoustic panel assembly in an open relief pocket defined by the perimeter mounting surface.

8. A method for fabricating a monolithic acoustically-treated composite structure, the method comprising the steps of:
   providing a male lay-up tool shaped to define an interior periphery of the monolithic acoustically-treated composite structure to be fabricated;
   selectively laying up one or more composite plies along an outer surface of the male lay-up tool forming a first composite ply lay-up and curing to form a unitary composite frame structure;
   including at least one acoustic panel assembly comprising an acoustic core and a perforated acoustic facesheet in the unitary composite frame structure such that an interior portion of the perforated acoustic facesheet forms an interior surface portion of the monolithic acoustically-treated composite structure to be fabricated, the at least one acoustic panel assembly cooperating with the unitary composite frame structure to form an internal frame assembly;
   laying up one or more composite plies over the internal frame assembly forming a second composite ply lay-up on the internal frame assembly;
   curing the second composite ply lay-up; and
   removing the male lay-up tool.

9. The method of claim 8, further comprising the step of providing at least one acoustic panel assembly prior to the including step, wherein each acoustic panel assembly of the at least one acoustic panel assembly comprises:
   the acoustic core comprising a plurality of cells having a first end and a second end; and
   the perforated acoustic facesheet having a front surface including a peripheral border portion surrounding the interior portion, a rear surface bonded to the first end of the acoustic core, and a plurality of spaced perforations.

10. The method of claim 9, wherein the unitary composite frame structure comprises a plurality of interconnected composite frame members that cooperate to define at least one side opening in the unitary composite frame structure, and wherein the step of including at least one acoustic panel assembly comprises extending an acoustic panel assembly of the at least one acoustic panel assembly across a side opening of the at least one side opening to complete a side panel of the internal frame assembly, wherein the plurality of interconnected composite frame members comprises a plurality of spaced-apart side frame members extending between upper and lower frame members, a pair of spaced-apart side frame members and a portion of each of the upper and lower frame members cooperating to form a perimeter mounting surface that surrounds each side opening for mounting of the peripheral border portion of the front surface of the perforated acoustic facesheet of the acoustic panel assembly thereto.

11. The method of claim 10, wherein the step of including at least one acoustic panel assembly comprises:
applying a bonding agent to at least a portion the peripheral border portion of the front surface of the acoustic facesheet, to at least a portion of the perimeter mounting surface, or both; and
positioning the at least one acoustic panel assembly outwardly and against the interconnecting frame members with the acoustic core extending rearwardly and outwardly from the perforated acoustic facesheet, the peripheral border portion of the front surface of the perforated acoustic facesheet bonded to the perimeter mounting surface and the interior portion on the outer surface of the male-lay up tool forming the interior portion of the monolithic acoustically-treated composite structure.

12. The method of claim 11, wherein the step of including at least one acoustic panel assembly in the unitary composite frame structure comprises forming the internal frame assembly defining an interior surface having a contoured or planar configuration that is substantially free of surface discontinuities.

* * * * *